United States Patent
Beals

(10) Patent No.: US 9,325,925 B2
(45) Date of Patent: *Apr. 26, 2016

(54) ANTENNA DIVERSITY FOR CONTROL DEVICE APPLICATIONS

(71) Applicant: EchoStar Technologies L.L.C., Englewood, CO (US)

(72) Inventor: William Michael Beals, Englewood, CO (US)

(73) Assignee: ECHOSTAR TECHNOLOGIES L.L.C., Englewood, CO (US)

( * ) Notice: Subject to any disclaimer, the term of this patent is extended or adjusted under 35 U.S.C. 154(b) by 163 days.

This patent is subject to a terminal disclaimer.

(21) Appl. No.: 13/789,150

(22) Filed: Mar. 7, 2013

(65) Prior Publication Data

US 2013/0182191 A1 Jul. 18, 2013

Related U.S. Application Data

(63) Continuation of application No. 12/347,632, filed on Dec. 31, 2008, now Pat. No. 8,418,211.

(51) Int. Cl.
*H04N 7/173* (2011.01)
*H04N 5/44* (2011.01)
(Continued)

(52) U.S. Cl.
CPC ............ *H04N 5/44* (2013.01); *H04N 5/4403* (2013.01); *H04N 21/42204* (2013.01); *H04N 21/4363* (2013.01); *H04N 21/43615* (2013.01); *H04N 2005/4433* (2013.01)

(58) Field of Classification Search
CPC ............ H04N 21/63; H04N 21/632; H04N 21/43615; H04N 2005/4423; H04N 21/42204; H04N 21/4126; H04N 21/422; H04N 21/42203; H04N 21/42206; H04N 21/42207; H04N 21/42208; H04N 21/42209; H04N 21/42212; H04N 21/42213; H04N 21/42214; H04N 21/42215; H04N 21/42216; H04N 21/42218; H04N 21/42219; H04N 21/4222; H04N 21/4221; H04N 21/42222; H04N 21/42224; H04N 21/42225; H04N 21/42226; H04N 21/42227; H04N 21/4228; H04N 21/44231; H04N 21/43622; H04N 21/43637; H04N 21/60
USPC .................. 348/734, 552; 725/81, 80, 74, 78; 340/13.24
See application file for complete search history.

(56) References Cited

U.S. PATENT DOCUMENTS 4,334,242 A 6/1982 Mangold
5,455,570 A 10/1995 Cook et al.
(Continued)

FOREIGN PATENT DOCUMENTS

EP 1 333 669 B1 10/2012

OTHER PUBLICATIONS

Communication Pursuant to Article 94(3) EPC, for corresponding European Application No. 09837022.4, dated Jun. 6, 2014, 6 pages.

*Primary Examiner* — Pankaj Kumar
*Assistant Examiner* — Reuben M Brown
(74) *Attorney, Agent, or Firm* — Seed Intellectual Property Law Group PLLC

(57) ABSTRACT

One embodiment may take the form of a method for routing a signal to a target device. The method may include a control device that may transmit a signal on a first network. The signal may reach devices other than the target device. The devices that receive the signal may recognize that the signal is intended for another device and may transmit the signal on a second network. The signal may be received by the target device via the second network.

13 Claims, 4 Drawing Sheets

(51) Int. Cl.
*H04N 21/422* (2011.01)
*H04N 21/436* (2011.01)
*H04N 21/4363* (2011.01)
*H04N 7/16* (2011.01)

(56) References Cited

U.S. PATENT DOCUMENTS

| | | | |
|---|---|---|---|
| 5,473,332 A | 12/1995 | James et al. | |
| 5,619,251 A | 4/1997 | Kuroiwa et al. | |
| 6,678,004 B1 | 1/2004 | Schultheiss et al. | |
| 7,499,462 B2 * | 3/2009 | MacMullan et al. | 370/401 |
| 7,761,594 B1 * | 7/2010 | Mowat | 709/238 |
| 7,865,568 B1 * | 1/2011 | Redi | G08C 17/02 |
| | | | 709/217 |
| 7,973,648 B2 | 7/2011 | Kawakita | |
| 8,736,427 B2 * | 5/2014 | King | 340/12.22 |
| 2004/0107344 A1 * | 6/2004 | Minemura et al. | 713/171 |
| 2004/0143847 A1 | 7/2004 | Suzuki et al. | |
| 2004/0205762 A1 * | 10/2004 | Ishiyama et al. | 718/105 |
| 2005/0198673 A1 | 9/2005 | Kit et al. | |
| 2005/0265261 A1 | 12/2005 | Droms et al. | |
| 2006/0023651 A1 * | 2/2006 | Tsuchiuchi et al. | 370/310 |
| 2008/0077965 A1 * | 3/2008 | Kamimaki et al. | 725/105 |
| 2008/0205388 A1 * | 8/2008 | Colville | H04L 45/26 |
| | | | 370/389 |
| 2008/0301729 A1 | 12/2008 | Broos et al. | |
| 2009/0064260 A1 * | 3/2009 | O'Callaghan | 725/131 |
| 2009/0235317 A1 | 9/2009 | Igarashi | |
| 2010/0162335 A1 * | 6/2010 | Davis | G08C 23/04 |
| | | | 725/110 |
| 2013/0024197 A1 * | 1/2013 | Jang et al. | 704/246 |

* cited by examiner

ANTENNA DIVERSITY FOR CONTROL DEVICE APPLICATIONS

BACKGROUND

1. Technical Field

The present invention generally relates to signal transmission devices and, more specifically, to transmitting and receiving signals between a control device and one or more signal transmission devices such as a set-top box.

2. Background Discussion

Various electronic components may be communicated with using a control device, such as a remote control. For example, stereo systems, lighting systems, video displays, digital video recorders ("DVRs"), set-top boxes and so on may be communicated with using a paired remote control. Additionally, it is common for one remote control, for example, a universal remote control, to be matched with and to communicate with one or more electronic components.

Generally, many households may have multiple electronic components and remote controls that may control and/or communicate with one or more of these components. For example, a household may include multiple video displays and set-top boxes. Continuing this example, a user may wish to change the current program deployed on the video display without having to manually change the channel outputted by the set-top box. In this example, the user may employ a remote control to transmit a control signal to the set-top box to select a new channel. Generally, a remote control may transmit a command for performing any number of functions including, but not limited to, changing a channel, recording a program, viewing an electronic programming guide and so on.

In another example, a household may have a video display in a separate room from its paired set-top box. The control device and the set-top box may be referred to as "paired" as the devices may have matching addresses. In this example, the user may wish to change the channel displayed on the video display and may employ a remote control to accomplish this. Specifically, the user may initiate a command via the remote control, which communicates with the set-top box. The set-top box, in turn, transmits the information for a different channel to the video display. In some cases though, a barrier may prevent the remote control from communicating with the set-top box. The barrier may be between the remote control and the set-top box and/or video display. When this happens, the user may have to physically position themselves closer to the set-top box to change the channel and/or physically go to the set-top box to change the channel on the set-top box and accordingly, on the video display in another room.

Accordingly, there is a need in the art for an improved method of routing signals between electronic components until the signal reaches a target device.

SUMMARY

One embodiment of the present invention may take the form of a method for controlling a first electronic device. A second electronic device may receive a control signal for the first electronic device across a first network. The second electronic device may transmit the control signal on a second network and the control signal may be received at the first electronic device. The first electronic device may execute the control signal. In one example, the first network may be a wireless network and the second network may be a wired network. Additionally, the first electronic device may be a set-top box and the second electronic device may be a set-top box. The first electronic device may be programmed to recognize an address of the remote control. The method may also include multiple electronic devices receiving the control signal via the first network and the multiple electronic devices may retransmit the control signal via the second network. When the control signal is a cloned signal, it may be ignored by the receiving electronic device.

Another embodiment of the present invention may take the form of a method for routing control signals. A first electronic device may receive a control signal transmitted on a first network and may determine whether the control signal is transmitted by a control device that is paired with the first electronic device. In the event the control signal is transmitted by a control device that is not paired with the first electronic device, the first electronic device may transmit the control signal on a second network. A second electronic device may receive the control signal on the second network and may determine whether the control signal is transmitted by the control device that is paired with the second electronic device. In the event the control signal is transmitted by a control device paired with the second electronic device, the second electronic device may execute the control signal.

Yet another embodiment of the present invention may take the form of a method for routing control signals. A first electronic device may receive a first control signal via a first network and a second control signal via the first network. The first electronic device may determine whether the first control signal and the second control signal are transmitted by a control device that is paired with the first electronic device and may determine whether the first control signal and the second control signal are cloned signals. In the event the first control signal and the second control signal are transmitted by a control device that is not paired with the first electronic device, and the first control signal and the second control signal are not cloned signals, the first electronic device may transmit the first control signal and the second control signal via a second network. A second electronic device may receive the first control signal and the second control signal. Additionally, the first electronic device may ignore the first control signal and the second control signal when the first control signal and the second control signals are cloned signals. The second electronic device may also determine whether the first control signal and the second control signal are transmitted by its paired control device and in the event the first control signal and the second control signal are transmitted by a control device that is paired with the second electronic device, the second electronic device may execute the first and second control signals.

DETAILED DESCRIPTION OF EMBODIMENTS

Figure 1:
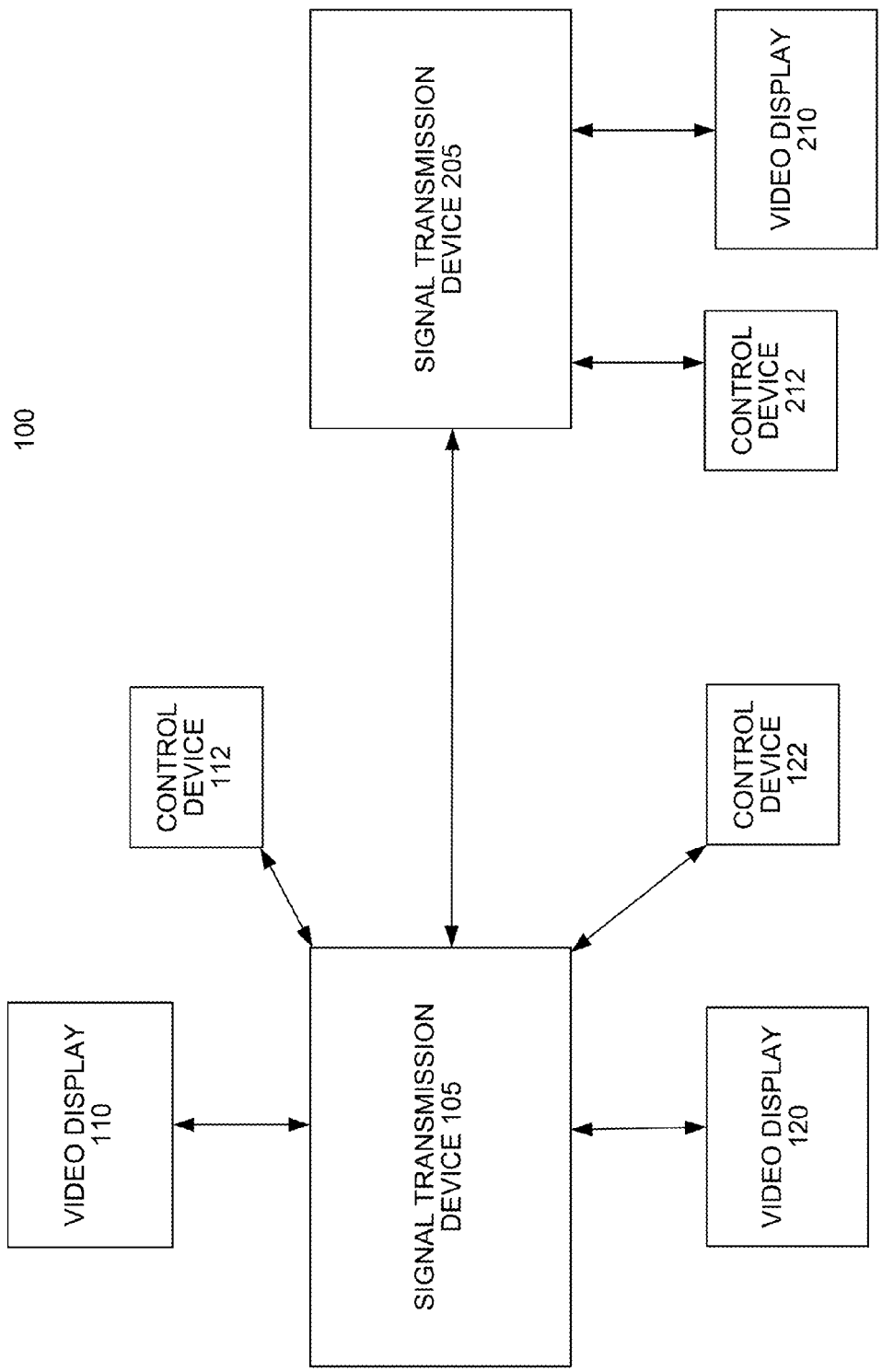
FIG. 1 depicts an example of a system generally illustrating one configuration of electronic components.

Generally, one embodiment of the present invention may take the form of a method for routing a signal between electronic components. In this embodiment, a control device may transmit an initial signal on a first network and the signal may be received by at least one signal transmission device. The initial signal may be received by all signal transmission devices within range of the control device. Each signal transmission device may have at least one paired control device; one such control device may control or otherwise interact with multiple television receivers such as a set-top box, DVR, cable receiver and so on. The signal transmission device may recognize and process control commands transmitted by its paired control device. Generally, a control device has a unique address and a signal transmission device may be programmed to recognize at least one control device address for a respective control device, thus the signal transmission device is paired with the control device.

Continuing this embodiment, the signal transmission device may determine that the signal is from an unpaired control device and may retransmit the signal via a second network as a duplicate signal. The retransmitted duplicate signal may be received by every device that is connected to the second network. Accordingly, at least a second signal transmission device may receive the duplicate signal. The second signal transmission device may determine if the signal is from its paired control device and may process the signal accordingly.

Another embodiment may take the form of a method for communicating with a television receiver. In this embodiment, a television receiver may receive signals, referred to herein as "initial signals," that may be transmitted from a control device via a first network. The control device transmitting the initial signal may or may not be the television receiver's paired control device. The television receiver may determine whether the initial signal is from its paired control device. In the event that the initial signal is from an unpaired control device, the television receiver may not process the initial signal and instead re-transmit the initial signal as a duplicate signal via a second network. The re-transmitted signal may be referred to herein as a duplicate signal. By contrast, if the initial signal is from the television receiver's paired control device, the television receiver may process the initial signal.

The television receiver may also receive other signals via the second network that may be retransmitted signals (duplicate signals) sent from other television receivers. As one example, the television receiver may determine that the duplicate signals received via the second network are also clones of one another and redundant, if both the signals are received within a predetermined time period, from the same control device and are the same control commands. Additionally, the television receiver may receive duplicate signals via the second network that are not clones of one another. For example, the signals may be received in a time period that is greater than the predetermined time period, but the signals may be from different control devices or may be different control commands. In this case, the television receiver may process the additional signals.

An example may serve to illustrate the foregoing. Presume a user wishes to control a particular electronic component, such as a set-top box in an upstairs bedroom, through its remote control while standing in a downstairs living room. The user may initiate a command via the remote, which may be wirelessly received by an electronic component in the living room (e.g., the room in which the user is standing). This electronic component may be, for example, a second set-top box, a video display, an electronic control for a window shade, an electronic control for a light, and so forth. For purposes of this example, the component will be referred to as the "living room component."

Upon receipt of the command, the living room component may determine the command was initiated by a remote with which the living room component is not paired. Thus, the living room component may transmit or repeat the command over another network to which it is connected. This network may be, for example, a wired or wireless local network, or a combination of two or more sub-networks. Presuming the upstairs set-top box is likewise connected to this network, it may receive the command from the living room component and execute it. The living room component thus essentially acts to repeat or relay the command from the remote to the upstairs set-top box, thereby permitting the user to control and/or communicate with the upstairs set-top box even though the remote may not directly communicate with it.

It should be noted that embodiments of the present invention may be used in a variety of satellite systems and video/audio processing systems. Embodiments may include or work with a variety of display components, electrical components, mobile devices, cellular devices and/or systems, communication systems, entertainment systems, receivers, transceivers, transmitters, converters, set-top boxes, video displays, and so on. Aspects of the present invention may be used with practically any apparatus related to receiving and transmitting signals, satellite systems, cellular devices and/or systems, entertainment systems, mobile devices, portable devices or any apparatus that may contain any type of display system or communication system. Accordingly, embodiments of the present invention may be employed in computing systems, satellite systems, cable systems, cellular systems, communications systems and devices used to process, transmit and/or receive signals and peripherals and so on.

Before explaining the disclosed embodiments in detail, it should be understood that the invention is not limited in its application to the details of the particular arrangements shown, because the invention is capable of other embodiments. Also, the terminology used herein is for the purpose of description and not of limitation.

FIG. 1 depicts an example of a system 100 generally illustrating one configuration of electronic components including, but not limited to, signal transmission devices, video displays and control devices as well as various possible connections and signal transmission paths between the components. These sample connections and signal transmission paths are provided for explanatory purposes; many other connections and signal transmission paths may be possible. The connections and signal transmission paths depicted in FIG. 1 will be described in more detail below.

FIG. 1 includes signal transmission devices 105 and 205, video displays 110, 120, 210 and control devices 112, 122, 212. In FIG. 1, the video displays may be devices such as, but not limited to, televisions, monitors, computer displays, handheld devices and so forth. Additionally, the signal transmission devices may be any type of video display receiver, such as a satellite or cable set-top box, a digital video recorder ("DVR"), a terrestrial broadcast receiver and so on. The signal transmission devices 105, 205 may be implemented as several separate units or may be included within a video display. The signal transmission devices 105, 205 may be referred to herein as "set-top boxes" or "television receivers" although such designation is not intended to exclude other receivers. The set-top boxes 105, 205 also may be referred to in the singular for explanatory purposes. Additionally, the signal transmission devices may include various functionalities, including, but not limited to, DVR functionality, infrared ("IR") blaster functionality, wireless or radio frequency ("RF") transmission capability and so on.

Generally, television receivers 105, 205 may be connected operationally, functionally, directly and so on to a cable television distributor, a satellite antenna or other communication device, a control device, a phone line connection, and/or one or more peripheral electronic devices such as video displays 110, 120, 210. The phone line and/or other networks can be used by the television receivers 105, 205 to communicate with one or more outside entities or systems. These communications may include requesting pay-per-view programming, obtaining updates to subscriber programming, and/or receiving updates to software on the television receivers 105, 205. One skilled in the art will recognize that there are many other uses for this phone line connection. The communication between the control device and the television receivers 105, 205 may be via the Internet, intranet, LAN, WAN, WIFI, wireless, coaxial cables, CAT 5 cabling, fiber optic connections and so on.

Figure 2:
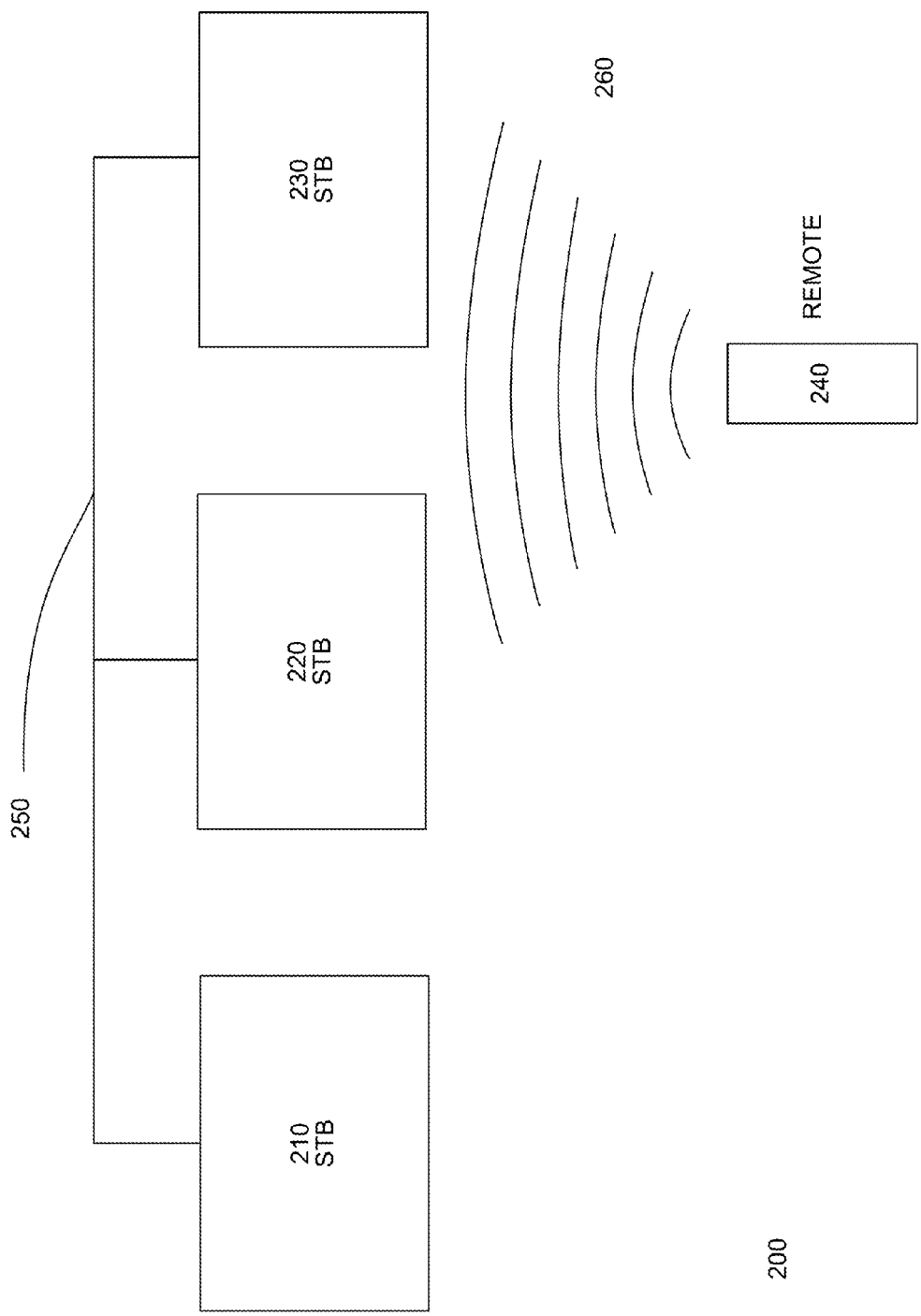
FIG. 2 depicts another example of a system generally illustrating another configuration of electronic components.
Figure 3:
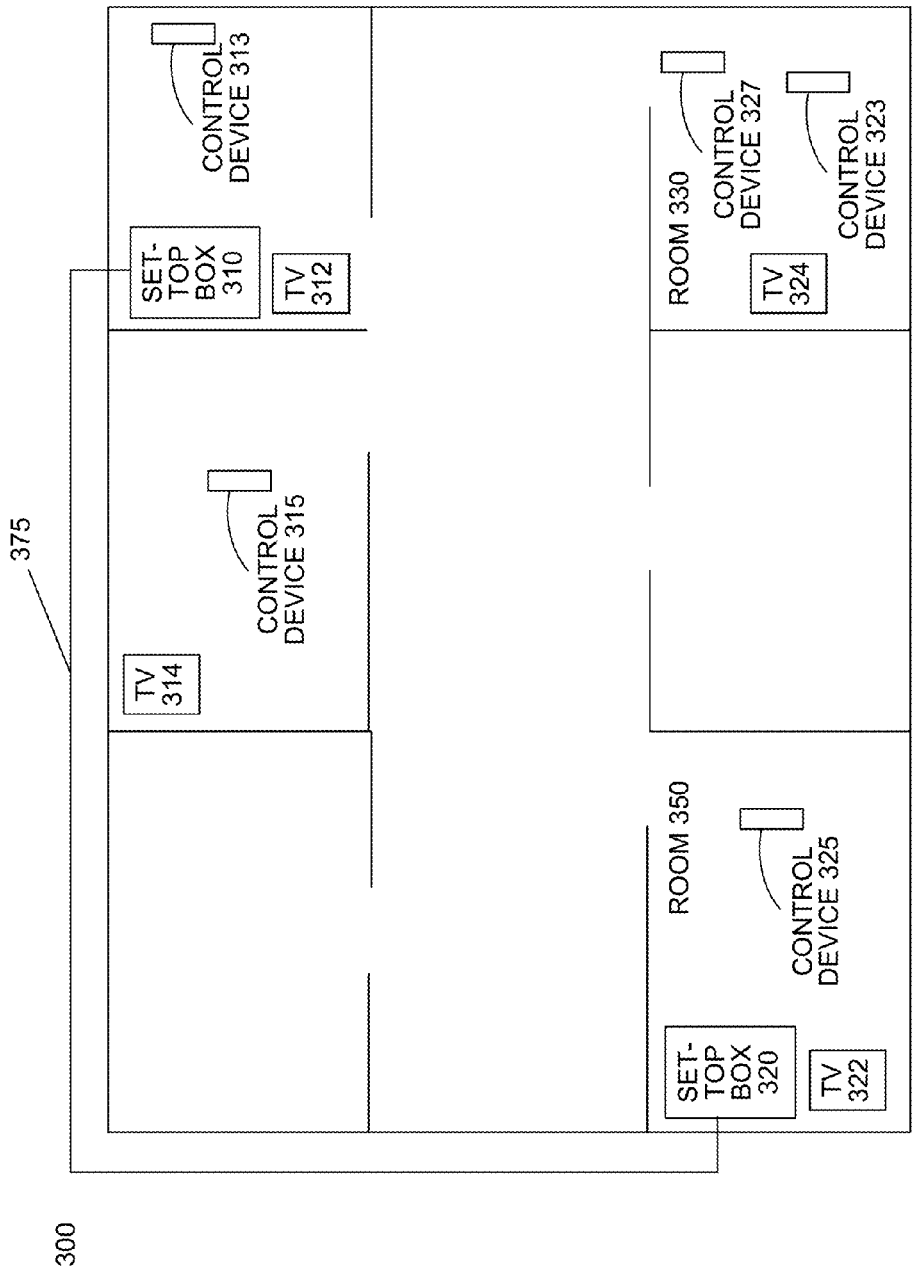
FIG. 3 depicts yet another example of a system generally illustrating one possible configuration of signal transmission devices, video devices and control devices in an environment.

Generally, the television receivers 105, 205 may receive television signals from a cable television distributor, a broadcast television provider, or satellite television distributor. The television receivers 105, 205 may process those television signals and may send the processed signals to peripheral electronic components. The television receivers also may accept commands from control devices 112, 122, 212. Additional discussion regarding the functionality of the television receivers 105, 205, is provided below. The components of FIGS. 1, 2 and 3 are provided for explanatory purposes only. Also, any number of components and varying types of components may be included in FIGS. 1, 2 and 3.

The control devices 112, 122, 212 may operate to communicate with and/or control various television receivers 105, 205. The control devices 130 may be alternatively referred to herein as a "remote control" or a "remote." The control device may be a cell phone, a computing system, a dedicated device for controlling and/or communicating with the television receiver and so on. The control devices 112, 122, 212 may communicate with the television receivers 105, 205 through a wired or a wireless connection. The wireless connection may be an IR signal, RF signal, wireless Internet Protocol ("IP") connection, cellular, WiMax, satellite signal, combinations thereof or otherwise. The control devices 112, 122, 212 need not be in the line of sight of the television receivers 105, 205 in order to control the television receivers. For example, control device 112 may control television receiver 105 even though the control device 112 is not in the line of sight of television receiver 105. Additionally, the control devices 112, 122, 212 may be located anywhere that permits communication with at least one television receiver. In addition to sending commands to the set-top boxes 105, 205, the control devices 112, 122, 212 may send signals to other peripheral electronic devices that may form part of, or interact with the system 100 such as the video displays, a stereo, a VCR, a DVD player and so on.

Generally, television receivers, such as set-top boxes, may be connected to one or more electronic components. For example, the set-top boxes of FIG. 1 may be operationally, directly, functionally or otherwise connected to one or more other set-top boxes, one or more televisions and so on. The video displays of FIG. 1 may be referred to herein as "displays" for explanatory purposes. The set-top boxes may be operationally, directly, functionally or otherwise connected to the electronic components. Communications between the set-top boxes and the electronic components may be provided through various interfaces such as a high definition multimedia interface ("HDMI") cable, a co-axial cable, a structured cable, wirelessly, an IP connection, a Homeplug™ connection, combinations thereof and so on. Generally, a Homeplug™ connection may use a home electrical system to transmit data between networked devices. A device may be part of a Homeplug™ network by plugging the device into an electrical outlet and assigning a password to the device.

Set-top boxes may also receive signals from one or more electronic components such as another set-top box, a video display, a control device and so on. These electronic components may transmit signals to or receive signals from a set-top box and vice versa. For example, in FIG. 1, a control device 112 may transmit a signal to set-top box 105. Continuing the example, the control device may send control commands as wireless signals such as IR signals or RF signals to the set-top box.

The control device 112 may have a unique address and the set-top box 105 may be programmed to recognize the unique address of the control device when embedded in, accompanying or forming part of a transmission from the control device 112. The set-top box 105 may be programmed to recognize more than one unique address. Thus, the set-top box 105 may be controlled by any control device which has a unique address recognized and acknowledged by the set-top box. Generally, a control device may control one or multiple devices and a set-top box may communicate with one or multiple components. For example, the control devices 112 and 122 may be paired with components other than set-top boxes, such as video displays 110 and 120. Additionally, the set-top box 105 may communicate with one or more video displays depending on at least the number of electronic components the set-top box may be connected to, the number of tuners within the set-top box and so on.

In the example of FIG. 1, the set-top box 105 may be connected to and may communicate with the video displays 110 and 120. Continuing this example, the set-top box 105 may also be paired with control devices 112 and 122. The set-top box 105 may be programmed to recognize the address of the paired control device 112 and 122. Accordingly, the set-top box 105 may receive control commands from each of the control devices 112 and 122 and, in response, potentially provide different audiovisual data to the appropriate video display 110 or 120. Even though the set-top box may be in range of an unpaired control device, the set-top box may process signals and/or control commands only from paired (e.g., recognized) control devices. The control device may be paired with to the set-top box when the set-top box has been programmed to receive the address of the control device.

As previously mentioned, a set-top box may be paired with more than one control device. For example, returning to FIG. 1, the set-top box 105 may be paired with two control devices 112 and 122 and the set-top box 105 may be connected to two video displays 110, 120. The set-top box may be configured with more than one tuner and each tuner may be programmed to recognize a control device. The set-top box may process control commands from more than one control device, thus enabling the user to employ one set-top box to transmit audiovisual data to two video displays. Also, the user may, via the set-top box 105, transmit audiovisual data to both video displays 110, 120 via their respective control devices 112, 122. For example, the user may also use the control device 122 to change the channel on video display 120. The control device 122 may transmit a control command which may be received by at least set-top box 105. Set-top box 105 may determine the control command is from the control device 122 (e.g., the control device that is paired with set-top box 105) and then may direct the results of the command to the video display 120.

FIG. 2 depicts another system 200 that generally illustrates another configuration of electronic components. FIG. 2 includes television receivers 210, 220 and 230 and a control device 240. The control device may be referred to herein as a "remote control" for explanatory purposes only. The television receivers 210, 220 and 230 may be connected to one another and may communicate with one another via a wired, wireless or hybrid connection 250, as well as by any other suitable networking connection. In FIG. 2, the network connection 250 is shown as a wired connection to illustrate one embodiment and may be any type of the previously discussed wired interface connections. It should be understood that alternative embodiments need not be restricted to a wired network.

Additionally, the control device 240 may correspond to a specific television receiver, for example, television receiver 210. The remote control 240 may communicate with the television receiver 210 by transmitting a signal and/or a control command via a wireless signal 260. The terms "signal" and "control command" may be used interchangeably herein. In FIG. 2, the control device 240 may have a unique address associated with it; the address may be included in the control command. For example, the control command may include a header, which in turn may include the control device address information.

In FIG. 2, a remote control may transmit a control command which is intended for a target television receiver, but the target television receiver may not receive the control command. This may be due to any number of factors, including proximity of the remote control to the target television receiver, quality and/or signal strength of the command transmitted from the remote control, an object blocking the target television receiver and so on. The terms "target set-top box" and "target television receiver" may be used herein to describe the set-top box and/or television receiver that may be paired with the control device that transmits the control command.

Also in FIG. 2, the television receiver 210 may be programmed to determine whether a control command has been transmitted from the television receiver's paired control device. In one example, the television receiver 210 may receive the signal and/or control command from the remote control 240, make the determination that the control command is from its paired remote control 240 and then process the control command transmitted by the remote control 240. As one example, the television receiver may determine that the control command is or is not from the remote control 240 by matching the control device address information included in the control command with the control device address information that may be programmed into the television receiver 210.

In the example of FIG. 2, the remote control 240 may transmit a control command. via a wireless signal 260. The target television receiver 210 may be configured to receive and process control commands from the control device 240. That is, the control device 240 may have a unique address and the target television receiver 210 may be programmed to recognize the unique address. Due to the proximity of the remote control 240 to the television receivers 220 and 230, the television receivers 220 and 230 may receive the initial control command, but the target television receiver 210 may not. Upon receiving the initial control command, the television receivers 220 and 230 may recognize that the initial control command is from an unpaired control device. The television receivers may then transmit control command over the wired connection 250 as a duplicate signal. The duplicate signal may thus be received by the target television receiver 210 via the wired connection 250. The target television receiver 210 may recognize the address of the control device 240 included in the duplicate signal. It may be possible for television receivers other than the target television receiver to receive the control command when the control command is transmitted as a duplicate signal via the wired connection 250. For example, television receiver 220 may receive the duplicate signal from television receiver 230 and vice versa. In this case, the television receivers 220, 230 may ignore the duplicate signals.

The target television receiver 210 may receive cloned signals, via the wired connection 250, from both of the television receivers 220, 230. That is, the target television receiver 210 may receive two control commands that are clones of one another across the wired connection. In this case, the target television receiver 210 may ignore the second of the two received control commands if both commands were received within a predetermined time period.

The predetermined time period may be defined to encompass the time frame for a television receiver to receive a wireless signal, retransmit the signal via a wired connection as a duplicate signal and for another television receiver to receive the duplicate signal. For example, the predetermined time period may be on the order of microseconds. However, the predetermined time period may be less than the time it make take a user to push the same control button twice on a remote control. In one embodiment, the predetermined time period may be less than a few milliseconds and on the order of microseconds. Even though a single television receiver may receive multiple control commands within the predetermined time period, it may repeat all such control commands across the second network 250 if the control commands are from different control devices and/or are different commands.

Additionally, television receivers other than the target television receiver may receive cloned control commands. These television receivers may be programmed to ignore cloned control commands that may be received within a predetermined time period. For example, television receivers 220 and 230 may receive, via the wireless signal 260, a control command that may be intended for television receiver 210. Both television receivers 220 and 230 may retransmit the control command as a duplicate signal via the wired connection 250. At least one of the television receivers 220 and 230 may receive the control command a second time. The television receivers may, once again, recognize that the cloned control command was transmitted from an unpaired control device by the control device address included in the header of the signal. This time, the television receivers may ignore the cloned control command and not transmit the cloned control command via the wired connection 250 because the control commands were received within a predetermined time period and were identical control commands and thus, cloned control commands.

In another embodiment, a user may transmit two or more consecutive control commands from the same control device 240 and to the same television receiver 210. The two consecutive control commands may be the same command or may be two different commands. The television receiver may determine that the two consecutive control commands are not duplicates. The control commands may be determined as different commands if the television receiver receives the commands outside of a predetermined time period. Additionally, even if the control commands are received within the predetermined time period, the control commands may be different commands if they are from two different control devices or the control commands are not identical to one another.

For example, a user may wish to change the station twice and may press the "channel up" button twice, or the user may change the station by pressing the "channel up" button and then decrease the volume by pressing the "volume down" button. In either case, both of the control commands may be transmitted via the wireless signal 260 by the control device 240. Continuing this example, the television receivers 220 and 230 may receive the first and second control commands via the wireless signal 260 and determine that neither of the control commands include addresses that the television receivers are configured to recognize. Still continuing the example, the television receivers 220, 230 may retransmit the first and second control commands via the wired connection 250 as duplicate signals. The target television receiver 210 may receive the first and second control commands via the wired connection 250. In the case that the first and second control commands are the same command transmitted twice by the user, typically they are received outside of the predetermined time period, and thus are not duplicate control commands. Accordingly, the target television receiver may process both commands. Other methods may be used to determine whether a command is unique such as, but not limited to, assigning each command a unique serial identification number in addition to the target television receiver identification information, employing a time seed and so on.

In other embodiments, multiple control devices may transmit signals to multiple television receivers. In any of these embodiments, the control devices may transmit the signals wirelessly. The television receivers may receive multiple signals via the wireless transmissions from the control devices and only process the signals received from paired control devices while transmitting signals from unpaired control devices via the second network 250. Also, the television receivers may receive multiple signals within the predetermined time period. When these signals are from the same unpaired control device, the duplicate signals may be ignored. When the signals are from different unpaired control devices, all the signals may be transmitted via the wired connection.

In yet another embodiment, control commands may be received by other devices wirelessly such as a stereo system or a computing system. The alternate device may receive the wireless signal and determine that the signal is not from its paired control device. Similar to a television receiver, the alternate device may be programmed to receive a unique address that identifies a specific control device. The alternate device may receive a control command, determine whether the control command includes the address from its paired control device. If the control command includes the address of the paired control device, the device may process the received control command. Alternatively, if the control command does not include the address from its paired control device, the device may retransmit the control command as a duplicate signal via a wired connection. The device may be configured to transmit control commands via control software that may be enabled on the alternate device.

In still another embodiment, control commands transmitted from the control device 240 may be received by a control box other than a television receiver. The control box may perform the functions of receiving and transmitting control commands. For example, the control box may receive and transmit control commands, but may not process the control commands. In one example, the control box may be a repeater.

FIG. 3 depicts an environment 300 generally illustrating one possible configuration of signal transmission devices, video devices and control devices. The configuration includes various components such as two set-top boxes 310, 320, video display devices 312, 314, 322, 324 and control devices 313, 315, 323, 325. The set-top box 310 may be configured to transmit audiovisual data to video display devices 312 and 314 and the set-top box 320 may be configured to transmit audiovisual data to video display devices 322 and 324. Additionally, the control devices 323, 325 may be paired with the set-top box 320 and the control devices 313, 315 may be paired with the set-top box 310. The set-top boxes 310, 320 may have more than one tuner and the tuners of one set-top box may be paired with, on a one to one basis, a video display. For example, the set-top box 310 may have two tuners. A first tuner of set-top box 310 may be paired with video display 312 and the other tuner of set-top box 310 may be paired with video display 314.

Additionally, the control devices may also be paired with the tuners, thus the control devices may communicate with the video displays that are paired with the respective tuners. Generally, when a control device "communicates" with other devices, the control device may transmit a signal. Also, when a set-top box "communicates" with other devices such as other set-top boxes, the set-top box may retransmit and/or repeat a signal and/or it may receive a signal from another device. In another example, the control devices 313, 315, 323, 325 may be remote controls. In FIG. 3, the remote controls 313, 315 may communicate with set-top box 310 and remote controls 323, 325 may communicate with set-top box 320. The remote control 313 may instruct the set-top box 310 to transmit audiovisual data to the video display 312 and the remote control 315 also may instruct the set-top box 310 to transmit audiovisual data to the video display 314. Similarly, the remote control 323 may instruct the set-top box 320 to transmit audiovisual data to the video display 322 and the remote control 325 also may instruct the set-top box 320 to transmit audiovisual data to the video display 324. Although all the control devices may transmit signals via a first network that may be received by all set-top boxes, the set-top boxes may not process signals received by unpaired control devices and instead, may retransmit the signals as duplicate signals over a second network.

In one example, the remote control may be located in the same room as the set-top box and the video display. For example, in FIG. 3, the remote control 313 is located in the same room as the set-top box 310 and the video display 312. A user may employ remote control 313 to change the channel on the video display 312. The remote control 313 may transmit a wireless signal to the set-top box 310, which in turn, may send a result of the control command to the video display 312 via the wired connection between the video display 312 and the set-top box 310.

In another example, the remote control need not be located in the same room as its paired set-top box. In this example, the remote control 315 may be located in the same room as the video display 314, but both the remote control and the video display may be located in a separate room from the paired set-top box 310. The remote control 315 may send a wireless signal, such as an RF signal, to the set-top box 310. In this example, the set-top box 310 and the set-top box 320 may receive the wireless signal. The set-top box 310 may determine that the signal is from its paired remote control 315 and may process the signal. Meanwhile, the set-top box 320 may also receive the wireless signal and determine that the signal is from an unpaired remote control. The set-top box 320 may then retransmit the control command as a duplicate signal via the wired connection to all other electronic components that may be connected by the wired connection. The set-top box 310 may receive the duplicate signal via the wired connection and may determine that the signal is from its paired control device. The set-top box 310 also may determine that the signal via the wired connection is a cloned signal because it and the signal received via the wireless signal were received within the predetermined time period and both signals were identical and from the same control device. Thus, the set-top box 310 may ignore the second cloned signal.

Also in FIG. 3, the remote control may be in a room with a video display to which it does not correspond. For example, the remote control 327 may be in a room 330 with video display 324. Remote control 327 may be paired with set-top box 320 and also may be paired and communicate with video display 324. Additionally, the remote control 323 may be in room 330 with video display 324 and may be paired with set-top box 320, but may be paired with video display 322. In this example, the user may wish to change the channel on video display 324, but may not know which control device 323 or 327 may be paired with video display 324. The user may press a button on remote control 323 which then transmits a wireless signal. The wireless signal may not be received by set-top box 320 for a number of reasons such as interference between room 330 and room 350. However, the wireless signal may be received by the set-top box 310. Set-top box 310 may determine that the wireless signal is from an unpaired remote control and may not process the signal. Additionally, the set-top box 310 may retransmit the signal as a duplicate signal via a wired connection 375. The set-top box 320 may receive the signal via the wired connection 375 and may determine the signal is from its paired remote control 323 and may process the signal and change the channel output to the video display 322. At this point, the user may see the channel has not changed on video display 324 and may now try the remote control 325. Then, as above, the set-top box 320 may change the channel on video display 324 and the user may know they have used the correct remote.

Figure 4:
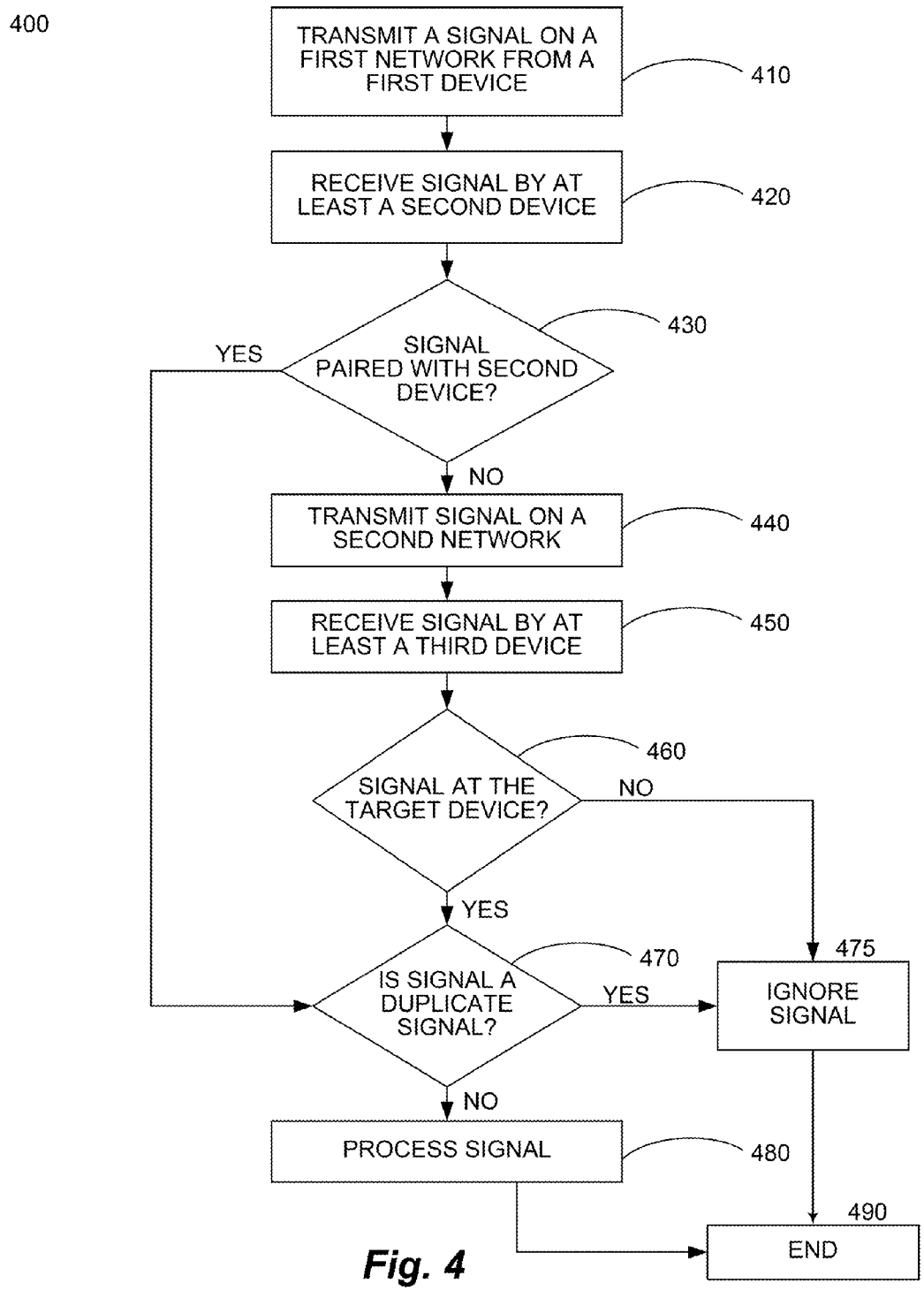
FIG. 4 is a flowchart depicting a sample method for routing signals between devices.

FIG. 4 is a flowchart generally describing one method 400 for routing a control command from a control device to a paired television receiver such as a set-top box. The operations of method 400 are provided in an order shown for explanatory purposes only. Generally, the operations of method 400 may be performed in a different order than discussed herein. For example, a signal transmitted on a first network from a first device may be received by a second and also received by a third device before it is determined whether the signal is from a control device paired with the second device as in operation 430.

In operation 410, a signal may be transmitted on a first network from a first device, such as a remote control. The remote control may communicate with other electronic devices via the first network, which may be wireless. The remote control may communicate with electronic devices such as, but not limited to, video displays, set-top boxes, DVRs, stereo systems and so on. As one example, a user may employ the control device of operation 410 to perform various functions such as changing the channel tuned to by a set-top box.

In operation 420, the signal may be received by at least a second device. As discussed with respect to operation 410, the second device may be an electronic device such as a set-top box. The receiving set-top box may or may not be the target device for which the signal is intended. Additionally, the signal transmitted by the remote control may be received by more than one set-top box. The signal may be intended for only one device or may be intended to control and/or communicate with more than one device. For example, the remote control may be paired with and therefore control and/or communicate with more than one set-top box. Although the remote control may have a unique address, its address may be programmed into more than one set-top box so that the remote control signal may be processed by more than one set-top box.

In operation 430, the second device determines whether the signal is from its paired remote control. As previously mentioned, the address of a remote control may be programmed onto a set-top box so that the set-top box may recognize the remote control address and process control commands from its paired remote control. In operation 430, the set-top box may determine whether the signal is from its paired remote control by determining whether the signal includes header information from its paired remote control. If the signal is from the set-top box's paired remote control, then the set-top box may proceed to operation 470 and determine whether the signal is a duplicate signal. If the signal is from an unpaired remote control, then the set-top box may proceed to operation 440.

After determining that the signal is from an unpaired remote control, the set-top box may transmit the signal on a second network as a duplicate signal in operation 440. The second network may be a wired network such as an IP connection, HomePlug™ and so on. The wired network may connect multiple electronic components together such as set-top boxes, computing devices, stereo systems and so on.

In operation 450, the signal may be received by a third device. The third device may be, for example, a remote set-top box. The remote set-top box may receive the signal via the wired connection. The signal transmitted via the wired network may also be received by other electronic components that are connected to the wired network. In operation 460, the remote set-top box (e.g., third device) may determine whether the signal is from a paired control device. Operation 460 may be similar to operation 430. In the event the remote set-top box determines that the signal is initiated by an unpaired control device/remote control, operation 475 is executed and the set-top box ignores the signal. After operation 475, the method 400 may proceed to operation 490 and end. If the set-top box determines that the signal is from its paired control device, then in operation 470, the set-top box may determine whether the signal is a cloned signal. A "cloned signal" refers to a transmission across the second network that is identical to another transmission across the same network. Thus, for example, two set-top boxes may both receive an original signal and each may determine the embedded command is intended for a different electronic device. Both set-top boxes may transmit a duplicate signal across the second network; each such duplicate signal may mirror the original signal. The duplicate signals are, therefore, cloned signal with respect to one another. The set-top box may determine that the signal is a cloned signal if two consecutive signals are received within a predetermined time period, are from the same control device and the signal includes the same control command. If two consecutive signals are received outside of the predetermined time period and include the same control command, the set-top box may determine that the second signal is not a cloned signal and may ignore the signal as set forth in operation 475. Then, in operation 480, the third device may process the signal and then proceed to operation 490 and the method 400 may end. As discussed previously, the third device may be a set-top box.

Although the present invention has been described with respect to particular apparatuses, configurations, components, systems and methods of operation, it will be appreciated by those of ordinary skill in the art upon reading this disclosure that certain changes or modifications to the embodiments and/or their operations, as described herein, may be made without departing from the spirit or scope of the invention. Accordingly, the proper scope of the invention is defined by the appended claims. The various embodiments, operations, components and configurations disclosed herein are generally exemplary rather than limiting in scope.

The invention claimed is:

1. A system comprising:
   a first electronic device; and
   a second electronic device configured to receive a control signal from a control device on a first network, to determine that the control device is not paired with the second electronic device, and to transmit the control signal to the first electronic device across a second network in response to determining that the control device is not paired with the second electronic device, the first electronic device being configured to receive the control signal from the second electronic device and to execute the control signal.

2. The system of claim 1, wherein at least one of the first network and the second network is a wireless network.

3. The system of claim 2, wherein at least one of the first network and the second network is a wired network.

4. The system of claim 1, wherein the second electronic device is a television receiver.

5. The system of claim 4, wherein the first electronic device is a television receiver.

6. The method of claim 1, further comprising programming the first electronic device to recognize an address of the remote control.

7. The system of claim 1, further comprising a third electronic device configured to receive the control signal via the first network and to retransmit the control signal via the second network.

8. The system of claim 1, wherein the first electronic device is configured to ignore the control signal if the control signal is a cloned signal.

9. A system comprising:
   a remote control configured to transmit a control signal on a first network;
   a first television receiver; and
   a second television receiver configured to receive the control signal from the remote control, to determine that the second television receiver is not paired to the remote control, and to transmit the control signal to the first television receiver on a second network in response to determining that the second television receiver s not paired to the remote control.

10. The system of claim 9, wherein the first network is a wireless network and the second network is a wired network.

11. The system of claim 9, wherein the second electronic device is configured to determine whether the control signal is a cloned signal.

12. The system of claim 11, wherein the second electronic device is configured to ignore the control signal if it is a cloned signal.

13. The system of claim 12, wherein the second electronic device is configured to execute the control signal if the second electronic device is paired to the remote control and the control signal is not a cloned signal.

* * * * *